(12) United States Patent
Schibsbye et al.

(10) Patent No.: US 12,195,864 B2
(45) Date of Patent: Jan. 14, 2025

(54) ELECTROLYSIS SYSTEM WITH A BUFFER TANK

(71) Applicant: Stiesdal Hydrogen A/S, Give (DK)

(72) Inventors: Karsten Schibsbye, Fredericia (DK); Henrik Stiesdal, Odense C (DK)

(73) Assignee: Stiesdal Hydrogen A/S, Give (DK)

( * ) Notice: Subject to any disclaimer, the term of this patent is extended or adjusted under 35 U.S.C. 154(b) by 0 days.

(21) Appl. No.: 18/273,490

(22) PCT Filed: Jan. 19, 2022

(86) PCT No.: PCT/DK2022/050008
§ 371 (c)(1),
(2) Date: Jul. 20, 2023

(87) PCT Pub. No.: WO2022/156868
PCT Pub. Date: Jul. 28, 2022

(65) Prior Publication Data
US 2024/0263332 A1    Aug. 8, 2024

(30) Foreign Application Priority Data
Jan. 22, 2021    (DK) ............................ PA 2021 00069

(51) Int. Cl.
| | | |
|---|---|---|
| C25B 15/08 | (2006.01) | |
| C25B 1/04 | (2021.01) | |
| C25B 9/05 | (2021.01) | |
| C25B 9/75 | (2021.01) | |
| C25B 9/77 | (2021.01) | |
| C25B 15/029 | (2021.01) | |

(52) U.S. Cl.
CPC ................ C25B 15/08 (2013.01); C25B 1/04 (2013.01); C25B 9/05 (2021.01); C25B 9/75 (2021.01); C25B 9/77 (2021.01); C25B 15/029 (2021.01)

(58) Field of Classification Search
CPC .. C25B 1/04; C25B 9/05; C25B 15/08; C25B 9/75; C25B 9/77; C25B 15/029
See application file for complete search history.

(56) References Cited

U.S. PATENT DOCUMENTS

2003/0141200 A1 * 7/2003 Harada ..................... C25B 1/04
                                                    205/637
2004/0072040 A1    4/2004 Duffy et al.
(Continued)

FOREIGN PATENT DOCUMENTS

| EP | 1473386 A1 | 11/2004 |
|---|---|---|
| EP | 2180087 A1 | 4/2010 |
| JP | 2007100204 A | 4/2007 |

*Primary Examiner* — Ciel P Contreras
(74) *Attorney, Agent, or Firm* — Elevated IP, LLC (57) ABSTRACT

An electrolysis system with a buffer tank An electrolysis system for production of hydrogen and/or oxygen comprising a stack of electrolysis cells inside a pressure vessel (18). Each electrolysis cell in the stack comprises a membrane (82A, 82B) and a cassette (12) made of a bipolar plate (74) sand-wiched by a cathode (30B) and an anode (78) forming a cathode compartment and an anode compartment on each side of the bipolar plate (74). The stack is enclosed in a container constituting a buffer container for storing hydrogen released in the stack. The stack has an outlet constituting a hydrogen outlet for flow of hydrogen gas into said buffer container for filling the buffer container with hydrogen gas.

16 Claims, 8 Drawing Sheets

(56) References Cited

U.S. PATENT DOCUMENTS

2010/0051473 A1    3/2010   Okabe et al.
2011/0210012 A1*   9/2011   Sioli .................... C25B 1/04
                                                                           205/742
2014/0069808 A1    3/2014   Wilson et al.

* cited by examiner

ELECTROLYSIS SYSTEM WITH A BUFFER TANK

CROSS-REFERENCE TO RELATED APPLICATIONS

This application is a 371 national stage application of International Patent Application No. PCT/DK2022/050008, filed Jan. 19, 2022, which claims the benefit of and priority to Danish Application No. PA 2021 00069, filed Jan. 22, 2021, each of which is hereby incorporated by reference in its entirety.

FIELD OF THE INVENTION

The present disclosure relates to a buffer tank/container for storing hydrogen released by an electrolysis system such as an electrolysis stack having a plurality of cells for producing hydrogen. In particular, it relates to an electrolysis system according to the preamble of the independent claim.

BACKGROUND OF THE INVENTION

During operation in prior art electrolysers, hydrogen is released as hydrogen gas at the cathode in each cell of the electrolysis stack. The release hydrogen gas takes up a relatively large volume, particularly if the electrolysis stack is non-pressurised. Such large volumes are disadvantageous. However, if, on the other hand, the containers are pressurised, and a pressure difference builds up on opposite sides of the membranes between the cathode and the anode, this may lead not only to leakage but also to rupture of the membrane.

In some prior art systems, the electrolyser is provided inside a pressure tank. An example of a pressurised container is disclosed in EP2180087A1 and JP2007-100204A. Other examples of electrolysers are disclosed in EP1473386A1 and US2010/051473A1.

Another example is disclosed in US2004/072040A1. In the latter, the problem with such pressure differences between the oxygen gas and the hydrogen gas is solved by an accumulator with a flexible wall for accumulating different relative amounts of oxygen and hydrogen on opposite sides of the wall. Additionally, the electrolyser is positioned inside a hydrogen tank which is connected to an oxygen tank by a tube that can shift water between the tanks and change water levels, thereby compensate for pressure differences. As water is used for removing the gases, the water accumulates in the tanks together with the gases and can be used for pressure equalization. In order to remove oxygen from the hydrogen tank, a catalyst-treated hood or bonnet is provided inside the hydrogen tank.

This system is relatively complex, which is a disadvantage. And the removal of the oxygen by the catalyst requires frequent maintenance in order to safeguard that the catalyst is still working sufficiently. It would be desirable to have a simpler system.

DESCRIPTION OF THE INVENTION

It is an objective of the present invention to provide an improvement in the art, in particular to provide a simplification of the system, for example in order to dispense with pumps and extensive pipeline routing outside of the stack, and provide efficient means for storing the released hydrogen gas.

The above object and advantages together with numerous other objects and advantages, which will be evident from the description of the present invention, as explained in more detail below.

According to a first aspect of the present invention, the objective is obtained by the following.

An electrolysis system for production of hydrogen, said electrolysis system comprising a stack of electrolysis cells including a first electrolysis cell and a second electrolysis cell, said first electrolysis cell comprising a first compartment including a first electrode and an electrolyte solution for releasing hydrogen gas in said first compartment, said stack enclosed in a chamber constituting a buffer container, said buffer container having a first end and a second end opposite said first end, said stack arranged between said first end and said second end, said stack having an outlet constituting a hydrogen outlet for flow of said hydrogen gas into said buffer container for filling said buffer container with hydrogen gas for storing said hydrogen gas.

It is useful if the buffer container at the bottom comprises an oxygen sensor for detecting oxygen, as this can be used for a warning about increased risk for explosion, especially if automated.

In order to remove excess oxygen, the system is optionally configured for removing oxygen from the buffer container via a valve at the bottom of the buffer container.

In some embodiments, the buffer container bulges outwards at the bottom, forming an excess oxygen container in the form of a hump. Advantageously, the oxygen sensor and the valve are placed at the excess oxygen container.

As a useful option, the hydrogen outlet is arranged for separating electrolyte solution from said hydrogen for containing said electrolyte solution in said first compartment, which assist in electrically insulating said first electrolysis cell and said second electrolysis cell from crossover currents. For example, for such separation, the hydrogen outlet is arranged above a surface of said electrolyte solution in said first compartment.

Notice that the separation of water and electrolyte from the hydrogen results in the tank not containing liquid in contrast to the aforementioned prior art. Accordingly, the volume for hydrogen in the buffer tank is free of liquid, in particular water or electrolyte solution.

The buffer container may have an outlet valve for opening for a flow of hydrogen gas out of said buffer container, the outlet valve for hydrogen being different from the valve for oxygen at the bottom of the buffer container.

Optionally, said stack having a first volume and said buffer container having a second volume, said buffer container arranged such that said second volume being at least 50% such as 70% or 100% greater than said first volume.

The stack has a first length, and the buffer container has a second length defined as the distance between said first end and said second end. For example, the buffer container the second length is at least 10% such as 25% or 50% or 100% greater than said first length.

In some useful embodiments, the buffer container comprises a first sensor for detecting hydrogen, wherein the first sensor is arranged above the bottom of said buffer container, such as at the top of said buffer container.

Set of Aspects

In the following, some interrelated aspects are described, which can be combined and also combined with the features above.

Aspect 1. An electrolysis system for production of hydrogen and/or oxygen, said electrolysis system comprising
  an electrolyte solution,
    a stack of electrolysis cells including a first electrolysis cell and a second electrolysis cell, said first electrolysis cell comprising
    a first compartment including a first electrode and said electrolyte solution for releasing hydrogen gas and/or oxygen gas in said first compartment,
    a first inlet constituting a water inlet for adding water to said first electrolysis cell,
    a first outlet preferably including an outlet pipeline constituting a hydrogen outlet for transporting hydrogen gas from said first electrolysis cell.

Aspect 2. An electrolysis system for production of hydrogen, said electrolysis system comprising
    a stack of electrolysis cells including a first electrolysis cell and a second electrolysis cell,
    said first electrolysis cell comprising a first compartment including a first electrode and
    an electrolyte solution for releasing hydrogen gas in said first compartment,
    said stack enclosed in a container constituting a buffer container,
    said buffer container having a first end and a second end opposite said first end,
    said stack arranged between said first end and said second end,
    said stack having an outlet constituting a hydrogen outlet for flow of said hydrogen gas into said buffer container for filling said buffer container with hydrogen gas for storing said hydrogen gas.

Aspect 3. The electrolysis system according to any of the preceding aspects, said first electrolysis cell comprising cooling means for transferring heat away from said electrolyte solution.

Aspect 4. The electrolysis system according to any of the preceding aspects, said hydrogen outlet arranged for separating electrolyte solution from said hydrogen for containing said electrolyte solution in said first compartment for electrically insulating said first electrolysis cell and said second electrolysis cell from crossover currents.

Aspect 5. The electrolysis system according to any of the preceding aspects, said cooling means including a surface area of a wall of said first compartment, said surface area facing the interior of said first compartment, and constituting a cooling area.

Aspect 6. The electrolysis system according to any of the preceding aspects, said first electrolysis cell comprising a second compartment including a second electrode and said electrolyte solution.

Aspect 7. The electrolysis system according to any of the preceding aspects, said first electrolysis cell comprising a bipolar plate or a pair of bipolar plates between said first compartment and said second compartment.

Aspect 8. The electrolysis system according to any of the preceding aspects, said bipolar plate being cooled by a cooling fluid.

Aspect 9. The electrolysis system according to any of the preceding aspects, said cooling area arranged at said bipolar plate.

Aspect 10. The electrolysis system according to any of the preceding aspects, said first electrode defining at least a part of a wall of said first compartment and including a first set of perforations for fluid communication of ions trough said first set of perforations during intended operational use of said electrolysis system.

Aspect 11. The electrolysis system according to any of the preceding aspects, said 25 cooling means including a cooling passage for flow of said electrolyte solution through said cooling passage.

Aspect 12. The electrolysis system according to aspect 11, said cooling passage being without said perforations.

Aspect 13. The electrolysis system according to any of the preceding aspects, said cooling means including a cooling channel for flow of cooling fluid through said cooling channel.

Aspect 14. The electrolysis system according to any of the preceding aspects, said cooling channel extending
  between said first electrolysis cell and said second electrolysis cell or
  between said pair of bipolar plates, or
  through said electrode compartment.

Aspect 15. The electrolysis system according to any of aspects 11 to 14, said cooling passage arranged adjacent said cooling channel or adjacent an edge of said first compartment.

Aspect 16. The electrolysis system according to aspects 29 and 11, said first electrode or said bipolar plate having a depression defining said cooling passage.

Aspect 17. The electrolysis system according to any of the preceding aspects, said hydrogen outlet arranged above the surface of said electrolyte solution in said first compartment.

Aspect 18. The electrolysis system according to any of the preceding aspects, said first compartment defining a volume, and said electrolyte solution in said first compartment occupying less than 100% of said volume such as less than 95% of said volume or between 80 to 95% of said volume.

Aspect 19. The electrolysis system according to any of the preceding aspects, said hydrogen outlet arranged such that hydrogen gas exiting from said hydrogen outlet being mixed with less than 10% electrolyte solution in vapor state, such as 5% or 1% during intended operation of said electrolysis system.

Aspect 20. The electrolysis system according to any of the preceding aspects, said first compartment having an exit passage for guiding said hydrogen gas towards said hydrogen outlet.

Aspect 21. The electrolysis system according to aspect 20, said exit passage guiding said hydrogen gas substantially horizontally towards said hydrogen outlet.

Aspect 22. The electrolysis system according to any of the preceding aspects, said stack comprising more than 40 electrolysis cells such as more than 400 electrolysis cells.

Aspect 23. The electrolysis system according to any of the preceding aspects, said stack enclosed in a pressure vessel for pressurizing said electrolyte solution.

Aspect 24. The electrolysis system according to aspect 23, said pressure vessel comprising a fluid such as water or air or said hydrogen.

Aspect 25. The electrolysis system according to aspect 24, said fluid being circulated inside said pressure vessel.

Aspect 26. The electrolysis system according to any of the preceding aspects, said first compartment having a width and height in a plane orthogonal to the direction of said stack, and a length in the direction of said stack.

Aspect 27. The electrolysis system according to any of the preceding aspects, said length being 1 to 50 mm, such as 1 to 10 mm, such as 4 mm.

Aspect 28. The electrolysis system according to any of the preceding aspects, said first compartment having a top, and a bottom, said hydrogen gas rising up towards said top during intended use of said electrolysis system.

Aspect 29. The electrolysis system according to any of the preceding aspects, said water inlet arranged at the bottom of said first compartment.

Aspect 30. The electrolysis system according to any of the preceding aspects, said water inlet arranged at the top of said first compartment.

Aspect 31. The electrolysis system according to any of the preceding aspects, said first electrolysis cell comprising a sensor for measuring the liquid level or amount of said electrolyte solution in said first compartment.

Aspect 32. The electrolysis system according to any of the preceding aspects, said first electrode arranged at a first side of a bipolar plate, and defining said first compartment together with said bipolar plate.

Aspect 33. The electrolysis system according to any of the preceding aspects, said first electrode being sealed to said bipolar plate along the edge of said first electrode.

Aspect 34. The electrolysis system according to any of the preceding aspects, said first electrode being galvanic connected to said second electrode preferably through said bipolar plate or pair of bipolar plates.

Aspect 35. The electrolysis system according to any of the preceding aspects, said first electrode being galvanic connected to said bipolar plate around the edge of said first electrode.

Aspect 36. The electrolysis system according to any of the preceding aspects, said first electrode having a galvanic connection to said bipolar plate positioned within said first compartment.

Aspect 37. The electrolysis system according to aspect 36, said galvanic connection formed as a depression in said first electrode or said bipolar plate.

Aspect 38. The electrolysis system according to any of the preceding aspects, a respective electrolysis cell being separated from a neighboring electrolysis cell by means of a membrane.

Aspect 39. The electrolysis system according to aspect 38, said membrane being electrically insulating.

Aspect 40. The electrolysis system according to any of aspects 38-39, said membrane arranged for passing ions trough said barrier for transporting of ions from a respective electrolysis cell to a neighboring electrolysis cell.

Aspect 41. The electrolysis system according to any of aspects 38-40, said membrane being hydrophile.

Aspect 42. An electrolysis system for production of hydrogen, said electrolysis system comprising
  a stack of electrolysis cells including a first electrolysis cell and a second electrolysis cell,
  said first electrolysis cell comprising a first compartment including a first electrode and an electrolyte solution for releasing hydrogen gas in said first compartment,
  said stack enclosed in a container constituting a buffer container for pressurizing said electrolyte solution and for storing said hydrogen gas,
  said buffer container having a first end and a second end opposite said first end,
  said stack arranged between said first end and said second end,
  said stack having an outlet constituting a hydrogen outlet for flow of said hydrogen gas into said buffer container,
  said stack having a first volume and said buffer container having a second volume,
  said buffer container arranged such that said second volume being at least 70% greater than said first volume.

Aspect 43. The electrolysis system according to any of the preceding aspects, said stack having a first length, and said buffer container having a second length defined as the distance between said first end and said second end, said buffer container arranged such that said second length being at least 10% such as 25% or 50% greater than said first length.

Aspect 44. The electrolysis system according to any of the preceding aspects, said stack having a first diagonal with a first length, and said buffer container having a second diagonal with a second length in a cross section orthogonal to the axis of said buffer container, said first diagonal defined as the maximum distance between any two aspects of the perimeter of said stack.

SHORT DESCRIPTION OF THE DRAWINGS

The invention will now be explained in more detail below by means of examples with reference to the accompanying drawings.

DETAILED DESCRIPTION

The invention may, however, be embodied in different forms than depicted below, and should not be construed as limited to any examples set forth herein. Rather, any examples are provided so that the disclosure will be thorough and complete, and will fully convey the scope of the invention to those skilled in the art. Like reference numerals refer to like elements throughout. Like elements will, thus, not be described in detail with respect to the description of each figure. A detailed description of embodiments of an electrolysis stack as well as embodiments of a buffer container will be described.

Figure 1:
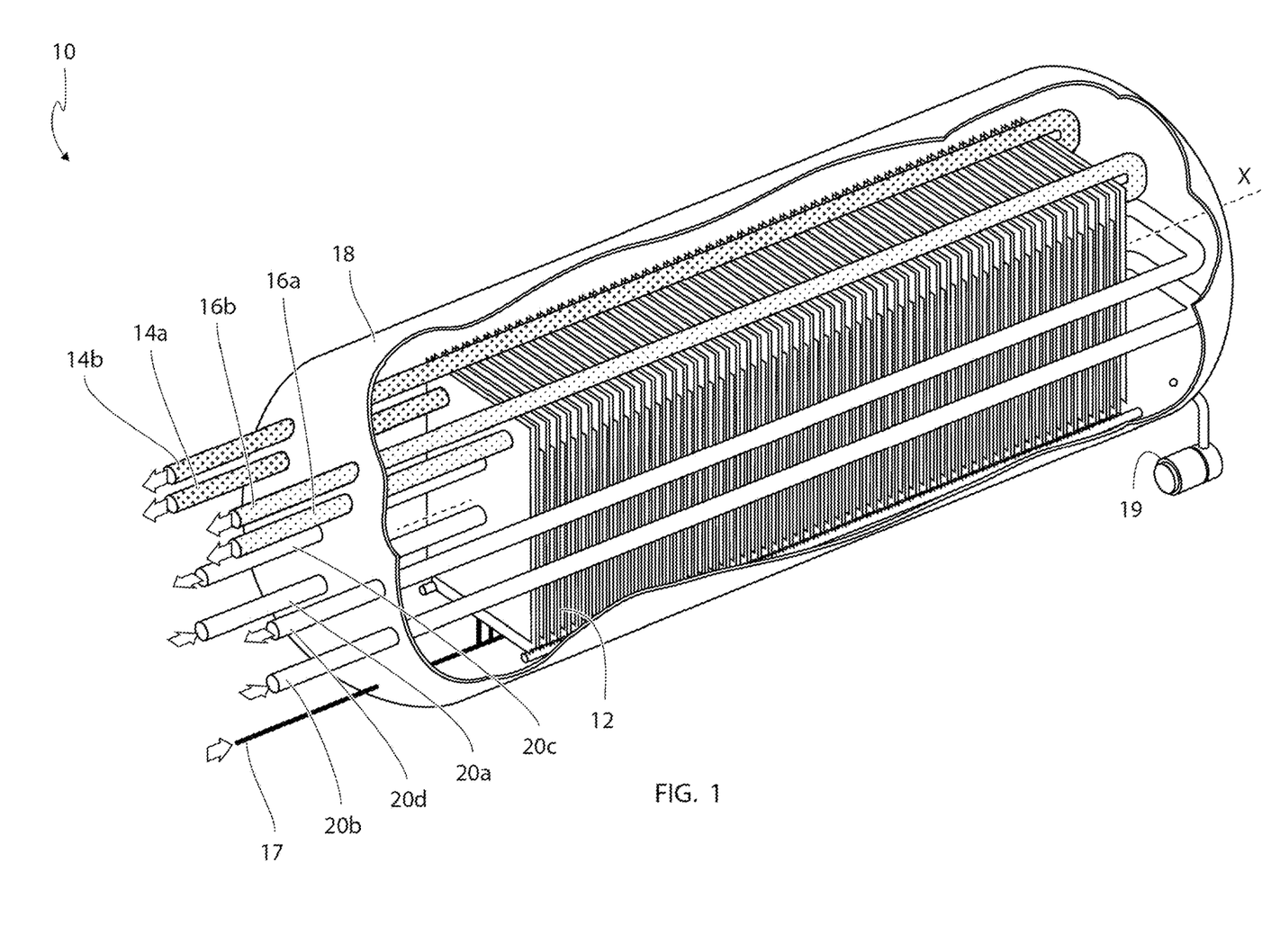
FIG. 1 shows a cutaway view of an electrolysis system for producing hydrogen during use of the system.

FIG. 1 shows a cutaway view of an electrolysis system 10 producing hydrogen during intended use of the system. The electrolysis system comprises a plurality of electrolysis cassettes including a first electrolysis cassette 12. The multiple electrolysis cassettes 12 are stacked next to each other along the length of the electrolysis system 10 (along the longitudinal axis X) and constitute a stack of electrolysis cassettes 12. The hydrogen is produced by decomposing water, and oxygen is therefore released as well. The electrolysis system may be used for other types of electrolysis. Each cassette 12 comprises a cathode compartment having a cathode and an anode compartment having an anode.

A cassette may be made as a bipolar plated sandwiched by a first electrode plate constituting the cathode, and a second electrode plate constituting the anode.

The stack is stacked so that an anode compartment of a respective cassette is followed by the cathode compartment of the next cassette in the stack—membranes (not shown) are between each cassette.

Alternatively, the stack may be arranged such that cathode and anode are across from each other and the cathodes are along a line parallel with the anodes. Such a stacking requires more use of material for the cells.

The stack may be sandwiched by a pair of terminals, one terminal at each end of the stack. Each terminal may be an aluminum plate.

A DC voltage may be applied across the terminals thereby establishing an electric field through the stack. The voltage may be in the low voltage (75 to 1500 volt DC) or medium voltage (more than 1500 volt DC), and a preferred voltage may be 850 volt DC. When the potential is applied, current is directed from the plus potential (anode) to minus potential (cathode), and electrons vice versa. Electrons enter the electrolysis solution at the cathode where hydrogen is released, and hydroxide ions flow from the cathode compartment in one cassette to the anode compartment in the neighboring cassette. Electrolysis takes place in each cassette 12 of the stack except for the compartment adjacent the terminal at the first end of the stack and the compartment adjacent the terminal at the other end of the stack.

The hydrogen exits from the system/stack in two pipelines 14a, 14b, i.e. a first hydrogen pipeline 14a exiting from the front of the system, and a second hydrogen pipeline 14b exiting from the back of the system, and being led to the front. A single pipeline may be used to transport hydrogen from the system. However, with two pipelines 14a, 14b, the diameter of the pipelines can be smaller compared to just having one pipeline.

Similarly, the oxygen exits from the system in two pipelines 16a, 16b, i.e. a first oxygen pipeline 16a exiting from the front of the system, and a second oxygen pipeline 16b exiting from the back of the system, and being led to the front.

The plus and minus terminal may be interchanged such that the direction of the electric field between the pair of terminals may be switched. In this way, the anodes and cathodes may be interchanged such that the wear on the cathodes may be reduced. The switching may be arranged in time intervals such that in a first time interval, the electric field is directed opposite the direction of the electric field in a second time interval.

A three way valve may be arranged at the outlets from the stack to control the flow of hydrogen and oxygen out of the stack so that the hydrogen and oxygen and directed to the intended pipelines in order to transport the hydrogen and oxygen away from the stack.

Water may be led to each cassette by a supply line 17. From the supply line 17, branch lines may extend up to each cassette.

The stack is inside a pressure vessel 18. The pressure vessel 18 constitutes a container arranged to hold a fluid (gas or liquid) at a pressure substantially different from the ambient pressure. This allows for the stack to be pressurized such that the hydrogen may exit as pressurized gas, and the oxygen may as well exit as pressurized gas.

A regulator 19 such as a pump or valve may be used to regulate the pressure inside the pressure vessel.

A preferred pressure may be 35 bar or 100 bar (such as 10 to 200 bar or 20 to 150 bar), and the pressure may be regulated with +/−0.1 bar.

A pressure sensor (not shown) such as a pressure gauge may be placed on any of the pipelines leading hydrogen or oxygen from the electrolysis system. In this way the pressure of for example the hydrogen may be measured, and a feedback to the regulator 19 may be provided for regulating the pressure inside the pressure vessel, i.e. if the pressure sensor shows an increased pressure of the hydrogen, the regulator may increase the pressure inside the pressure vessel such that the pressure in the pressure vessel corresponds to the pressure in the pipeline or vice versa.

Instead of a pressure vessel 18, the stack could be placed at normal air pressure (standard atmosphere pressure), and a pump could be used to pressurize the hydrogen gas exiting from the electrolysis system for providing pressurized hydrogen.

In the figure, four additional pipelines are shown. These may be used as cooling pipelines extending through the inside of each cassette such that the electrolyte solution may come in direct contact with a cooling pipeline.

A first cooling pipeline 20a may transports cooling fluid into the stack at the bottom at the first end of the stack. A second cooling pipeline 20b may transports cooling fluid into the stack at the bottom at the second end of the stack. As an alternative, one pipeline may be used to transport cooling fluid into the stack. Using two cooling pipelines into the stack provides a more efficient cooling compared to one pipeline with the same diameter.

The cooling fluid exits from the stack via a third cooling pipeline 20c exiting at the top at the first end of the stack. The cooling fluid also exits from the stack via a fourth cooling pipeline 20d exiting at the top at the second end of the stack. The pipelines may be interchanged, i.e. cooling fluid may enter into a cassette at the top of the cassette instead of at the bottom.

Alternatively, the stack may be cooled by cooling fluid being put in motion inside the pressure vessel, for example by having a pump (not shown) for pumping cooling fluid around inside the pressure vessel.

Such a cooling fluid may be air or a liquid not prone to electrolysis such that electrolysis out in the pressure vessel can be avoided. It may also be hydrogen gas released from the cells in the stack during operation of the electrolysis system.

The stack may be assembled and placed in a first frame for supporting the stack. The stack may be held together in the longitudinal direction by a number of nuts and bolts.

This may ensure a seal such that electrolysis solution does not exit into the pressure vessel.

The pressure vessel may comprise a second frame for supporting the assembly of the stack and first frame.

The pressure vessel may be constructed as a steel pipe or glass fiber, and may have a hemispherical shaped steel plate at each end.

Figure 2:
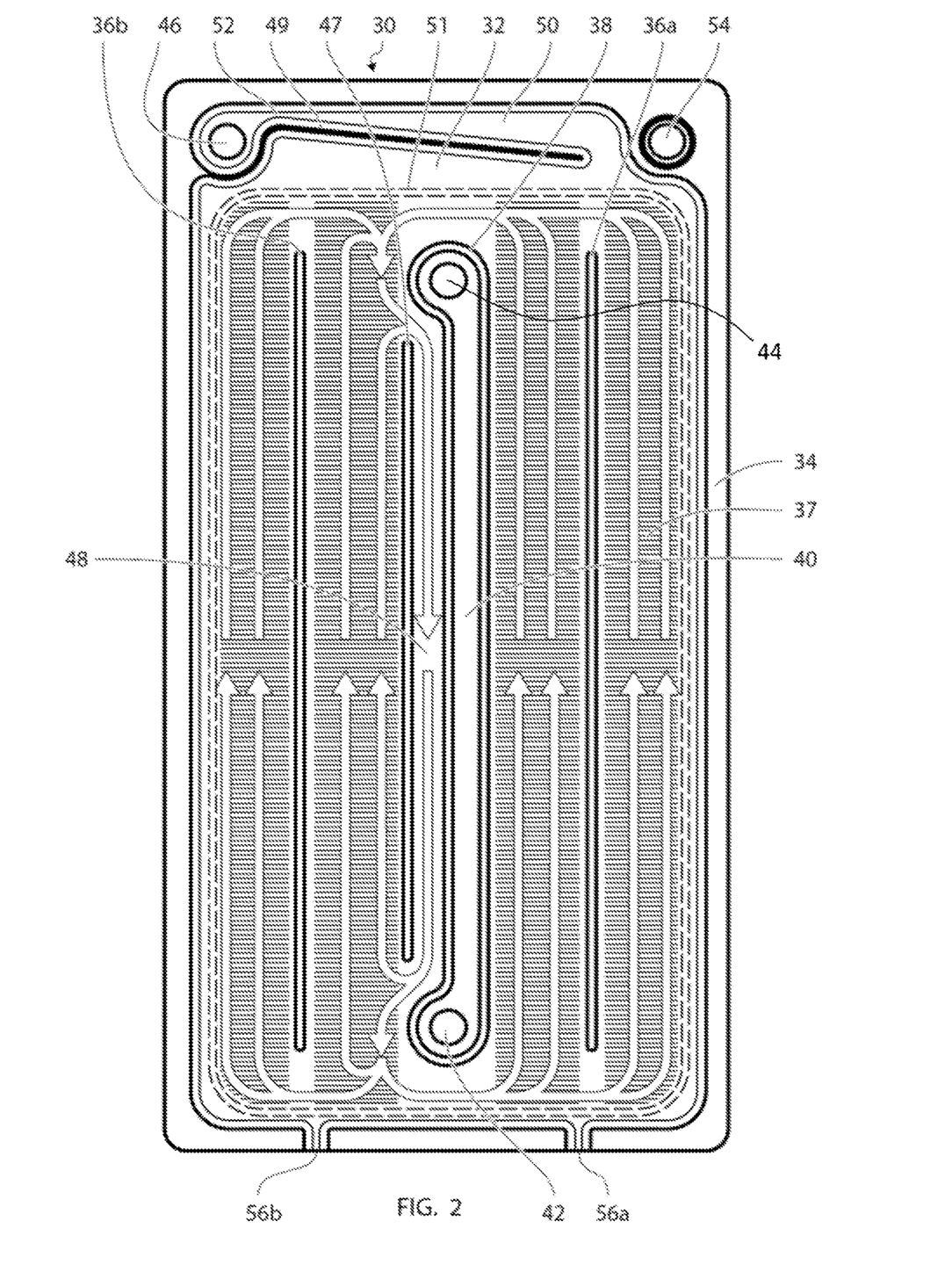
FIG. 2 shows an example of a cathode or anode, i.e. electrode in the form of an electrode plate.

FIG. 2 shows an example of a cathode or anode, i.e. electrode in the form of an electrode plate.

The details explained below regarding the electrode may be the same whether the electrode is a cathode or an anode, i.e. whether the electrode is an anode or cathode depends on the direction of an applied electric field through the stack.

The electrode plate 30 may be of stainless steel with a thickness of about 0.5 mm (such as between 0.1 mm to 1 cm, or 0.1 to 2 mm), and may be embossed into a shape such that it defines a volume 32 for an electrolyte solution.

The embossing operation may be accomplished with a combination of pressure and heat or pressure alone. Hereby may be formed a depression in the plate.

The area 34 extending along the edge of the plate and about 5 mm inwards (such as 1 to 15 mm) from the edge may be planar and may be used as a contact area for establishing an electric connection to a bipolar plate (not shown), which may be welded to the electrode plate (for providing transport of electrons between the cathode and anode), i.e. such that the anode and cathode are galvanic connected, preferably via the bipolar plate.

Additional electrical connections may be provided inside the volume such as a first ridge 36a and optionally a second ridge 36b. Additional electrical connections, or a greater area 34 may provide for higher current.

A ridge may be provided by pressing the electrode plate with a die having a depression corresponding to the inverse of the ridge.

An additional electrical connection may also be formed by welding a spacer at a position inside the volume.

The electrical connection (ridge or spacer) may have a height such that it will contact the bipolar plate connected to the electrode plate.

The electrode plate has perforations including a first perforation 37 for the flow of ions through the perforations. The electrolysis reaction takes place at the perforations.

Each perforation may be made by laser cutting (such as flying cut), and may extend horizontally as shown in the figure, or it may extend vertically. Alternatively, the perforations may be punched out, and they may have shapes other than as rectangular apertures, such as round, star shaped or elliptical.

The figure illustrates four areas having perforations. There may be more or less than four areas with perforations. A third ridge 38 may form a loop inside the volume and define a second volume or channel 40 constituting a cooling channel. The cooling channel may extend from the bottom of the electrode plate to the top.

As an alternative or supplement to extending through the compartment/volume defined by the electrode, the cooling channel may extend between a pair of bipolar plates, which may be arranged between the cathode and anode, or it may extend between two cells.

The electrode may comprise an opening 42 constituting a cooling inlet for transporting cooling fluid into the cooling channel from a cooling pipeline leading cooling fluid to the system.

The electrode may comprise an opening 44 constituting a cooling outlet for transporting cooling fluid out from the cooling channel 40.

Alternatively, the cooling fluid may enter at the opening 44 at the top and exit at the opening 42 at the bottom of the electrode plate 30.

The third ridge 38 may also function as an electrical connection to a bipolar plate connected to the electrode plate.

A fourth ridge 47 may be placed adjacent the third ridge 38 such that a passage 48 may be defined between the third ridge 38 and the fourth ridge, the passage 48 constituting a cooling passage for the electrolyte, which is transferring thermal energy through the third ridge 38 to the coolant in the cooling channel 40. The cooling passage 48 extends in an area of the electrode plate without perforations such that no electrolysis takes place in the cooling passage.

The arrows illustrated in FIG. 2 shows the flow of electrolyte solution during operation.

As electrolysis takes place at a respective perforation, the released gas will rise upwards towards the top of the electrode plate.

The cooling passage 48 allows for the electrolyte solution to be cooled when it passes through the cooling passage back down towards the bottom of the plate.

The cooling channel 40 may be at an offset with respect to the centerline of the electrode plate. The cooling passage may be cooled from the bipolar plate, due to a second cooling channel of the second electrode plate on the other side of the bipolar plate, the second electrode plate being turned 180 degrees around a vertical centerline.

In the stack, the backside of the electrode plate 30, for example anode plate 30B, will face a backside of a third electrode plate (turned 180 degrees around a vertical centerline), and the cooling passage may also be cooled by the cooling channel of the third electrode, i.e. cooled from the backside.

In total, the cooling passage 48 may be cooled from one, two or up to three sides.

The fourth ridge 47 may also function as an electrical connection to a bipolar plate 74 connected to the electrode plate 30.

The backside of the electrode plate 30, i.e. the side opposite the inner side of the electrode plate 30 where the ridges 36a,36b, 38, 47 are, may have a recess 51 extending 360 degrees around the perforations. The recess 51 will in effect appear as a ridge when seen from the inside of the volume, but the ridge being lower than the other ridges 36a,36b, 38, 47 described above. A gasket 51A such as an O-ring may be placed in the recess 51. As an alternative to using an O-ring 51A in a recess 51, glue or a liquid gasket may be used to ensure a seal.

The plate 30 may have an opening 46 constituting a gas outlet for transporting released gas out of the volume 32. The gas outlet may be placed at the top of the electrode plate, optionally at a corner of electrode plate.

The plate may comprise a separator for separating any electrolyte solution mixed with the released gas for reducing the amount of electrolyte solution exiting with the released gas.

The separator may comprise a fifth ridge 49 may define a passage 50 for leading released gas, such as hydrogen, towards the gas outlet 46. The passage 50 may be between the fifth ridge 49 and the top of the electrode plate 30. The highest point on the fifth ridge 52 may be positioned higher than the gas outlet. The fifth ridge 49 may extend from the gas outlet 46 with an angle such as an angle between 0 to 30 degrees for forcing electrolyte solution downwards. The fifth ridge 49 may also function as an electrical connection to a bipolar plate 74 connected to the electrode plate 30.

The figure shows an opening 54 constituting a gas outlet for transporting gas released from the other electrode of the cassette, such as the cathode. The volume 32 is not in fluid communication with the opening 54. The opening 54 is placed at a corner opposite the opening of the gas outlet 46.

For example, the gas outlet 46 is a hydrogen gas outlet, and the opening 54 is an oxygen outlet.

The electrode plate may have an opening 56a constituting a water inlet for transporting water into the volume 32. The water inlet 56a may be placed at the bottom of the electrode plate 30.

Alternatively, the water inlet 56a may be arranged at the top of the electrode plate 30 such as above the surface of the electrolyte solution such that water may be added by dripping down into the electrolyte solution.

It may be measured by means of a sensor such as a flow sensor, how much gas is produced by the electrolysis system or in an electrode compartment in order to add a corresponding amount of water.

Alternatively, a sensor such as a level sensor or pressure sensor (at the bottom of the compartment for example) may measure the level of the electrolyte solution for determining the amount of electrolyte solution in the compartment.

The surface of the electrolyte solution may refer to when the electrolysis plant is at standstill and not operating.

An additional water inlet 56b may be provided.

Figure 3:
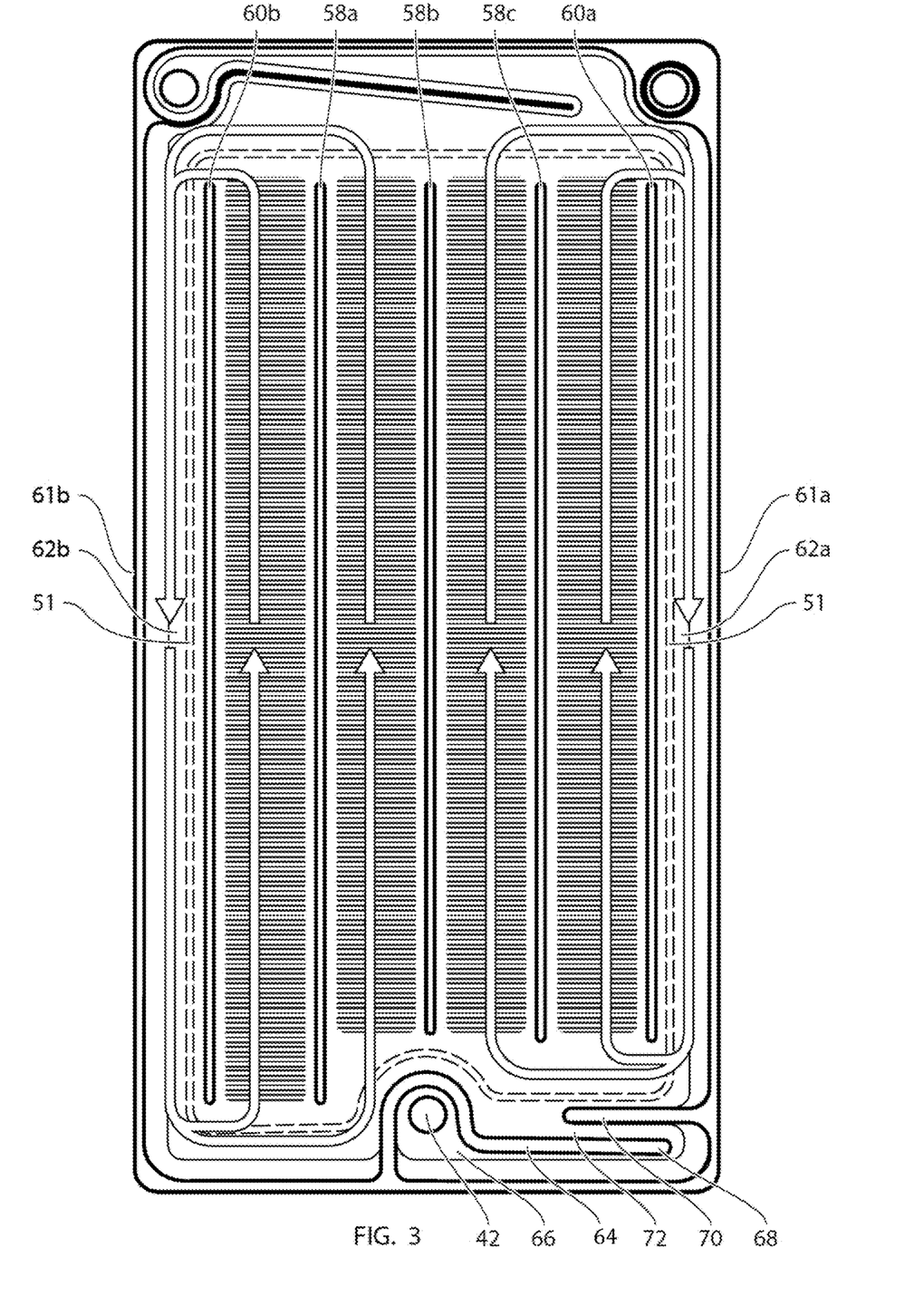
FIG. 3 shows another example of an electrode plate.

FIG. 3 shows another example of an electrode plate. The plate has four areas with perforations where electrolysis takes place. There may be more or less than four areas with perforations.

Ridges 58a,b,c extend between the areas. The ridges 58a,b,c constitute electric connections to a bipolar plate 74 as explained in more detail in connection with FIG. 2.

Contrary to the plate shown in FIG. 2, the plate of FIG. 3 does not have an internal channel for a flow of cooling fluid. Instead the plate has a ridge 60a adjacent an edge 61a of the plate for defining a passage 62a. The passage may be between the ridge 60a and the edge 61a. The edge 61a is a vertical arranged edge, extending from top to bottom of the plate. The ridge 60a may also function as an electrical connection to a bipolar plate connected to the electrode plate. The passage is without perforations. The electrolyte solution may flow upwards at the four areas with electrolysis and circulate back down in the passage. Since the passage is at the edge, the electrolyte solution may release heat at the edge and be cooled. The effect may be increased by having a flow of cooling fluid outside the plate at the edge.

The plate may have a ridge 60b adjacent an edge 61b, opposite the edge 61a, for defining a passage 62b. The passage 62b may be between the ridge 60b and the edge 61b. The ridge 60b may also function as an electrical connection to a bipolar plate connected to the electrode plate. The passage is without perforations. The electrolyte solution may flow upwards at the four areas with electrolysis and circulate back down in the passage.

The "internal" cooling shown in FIG. 2, i.e. defined by the ridge 32 and openings 42, 44 may be included in the plate of FIG. 3.

The plate shown in FIG. 3 comprises an opening 56 constituting a water inlet for transporting water into the volume 32. The water inlet may be placed at the bottom of the plate.

The plate may comprise a separator for stopping flow of electrolyte solution out through the water inlet, for example in the case where the electrolyte solution is heavier than water. The separator may comprise a first ridge 64, which may define a first passage 66 for leading water from the water inlet and through the passage 66 into the volume 32. The first passage 66 may be between the first ridge 64 and the bottom of the electrode plate, i.e. part of the first passage 66 is below the water inlet. The first ridge 64 may have an end 68 defining an outlet from the first passage 66 leading the water out into the volume.

A second ridge 70 may be placed above the first ridge 64 and defining a second passage 72 between the ridges 64, 70. In the second passage 72, the water flow may be in the opposite direction than the water flow in the first passage 66.

The first ridge 64 and/or the second ridge 70 may also function as an electrical connection to a bipolar plate 74 connected to the electrode plate 30.

Figure 4:
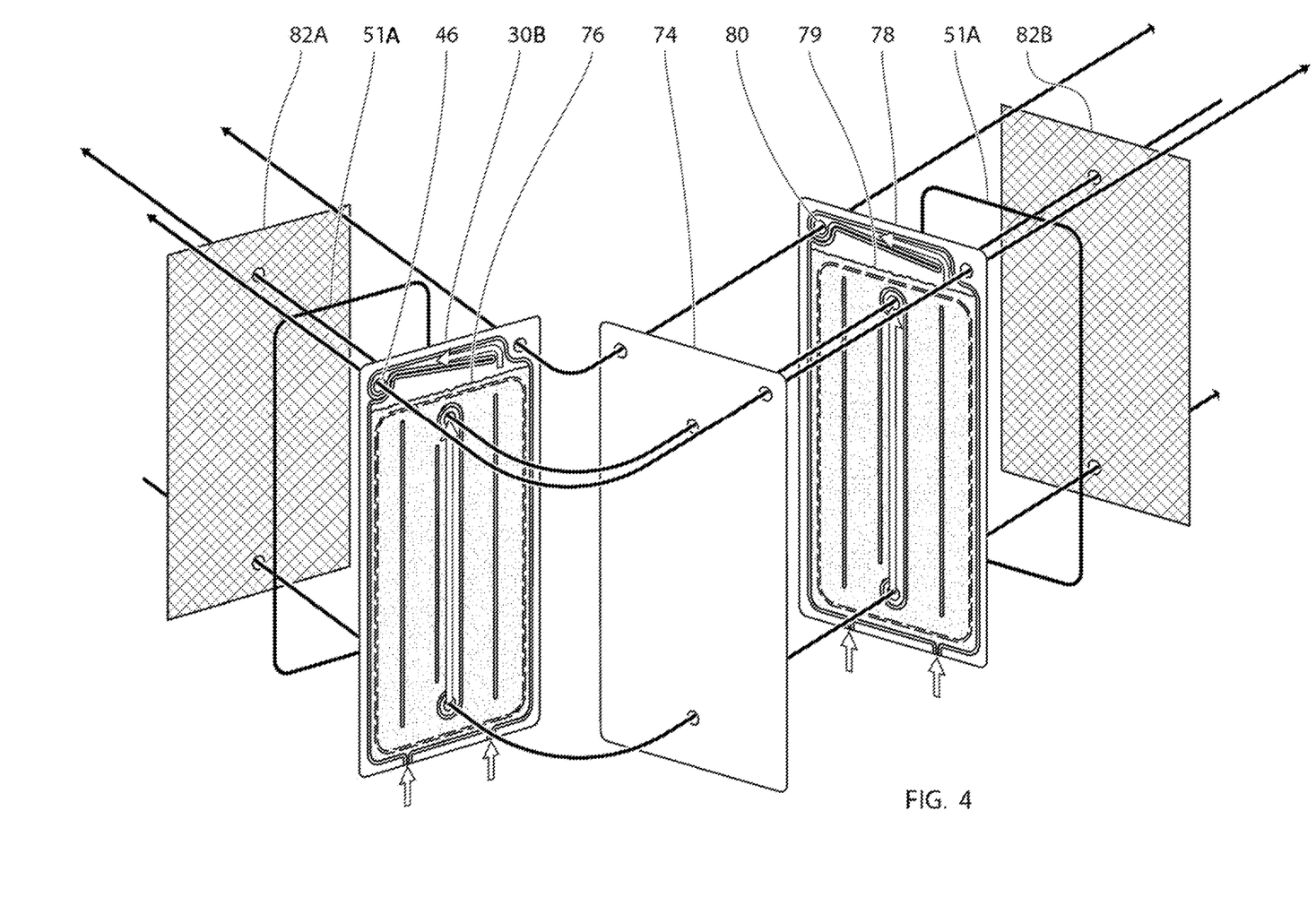
FIG. 4 shows an exploded view of parts of a stack of an electrolysis system.

FIG. 4 shows an exploded view of parts of a stack of an electrolysis system. The parts in FIG. 4 are shown along a bend line for illustrative purpose.

An electrode plate as described in connection with FIG. 2 is shown to the left of a bipolar plate 74. The electrode plate constitutes a cathode plate 30B. The depression in the cathode plate 30B forms a volume, which is enclosed when the bipolar plate 74 is connected to the cathode plate 30B, for example by welding along the edge of the cathode plate 30B. The volume enclosed by the cathode plate 30B and the bipolar plate 74 may constitute a cathode compartment. The electrolysis takes place at the perforations of the electrode plate.

The openings (inlets and outlets into the volume) may be sealed by gaskets.

An electrolyte solution is illustrated in the volume of the cathode compartment with the surface 76.

The electrolyte solution may cover the highest placed perforation in the cathode, and the surface of the electrolyte solution may be below the gas outlet 46, i.e. the volume is partly filled with electrolyte solution for preventing that the electrolyte solution flows out of the gas outlet 46—the electrolyte solution may occupy a volume of the cathode compartment such that the hydrogen gas exiting from the hydrogen outlet is mixed with less than 10% electrolyte solution in vapor state, such as 5% or 1%.

The passage 50 may be provided to increase the separation so that a larger part of the cathode compartment can be filled with electrolyte solution.

The electrolyte solution may be water or water mixed with a base such as potassium hydroxide (KOH).

Instead of embossing the electrode plate, the bipolar plate 74 may be embossed such that a depression in the bipolar plate 74 forms the volume for the electrolyte solution.

The ridges of the electrode plate may in that case be on the bipolar plate, and the electrode plate may be planar/flat—except for any recess for a gasket.

The area for perforations on the electrode plate may be increased when it is the bipolar plate 74 that is embossed.

To the right of the bipolar plate 74 is shown a second electrode plate constituting an anode plate 78. The anode plate may be a copy of the cathode plate 30B, and turned 180 degrees around a vertical axis.

Like the cathode plate 30B, the depression in the anode plate 78 forms a volume, which may be enclosed when put together with the bipolar plate, thus forming an anode compartment. As for the cathode, the electrolyte solution has a surface 79 below the gas outlet 80.

Instead of embossing the anode plate 78, two bipolar plates 74 may be provided and embossed such that a depression in the first bipolar plate may form the volume for the electrolyte solution of the cathode as explained above, and a depression in the second bipolar plate may form the volume for the electrolyte solution of the anode. The ridges of the anode plate may in that case be on the second bipolar plate.

When using two bipolar plates, cooling fluid may be introduced between the two bipolar plates for cooling the anode and cathode compartments respectively. In this way, the entire area of electrode plates may be used for perforations.

It is contemplated that the cassette 12 comprises the cathode plate 30B, bipolar plate 74, and anode plate 78.

A compartment/electrode plate may be arranged such that the electrolyte solution will circulate substantially around an axis parallel to the longitudinal axis X of the stack. "Substantially" meaning that more electrolyte solution circulate around the axis parallel to the longitudinal axis than around axis with other directions. For example, the depth of the compartment may be so that the electrolysis solution will have such a circulation, i.e. a narrow compartment may be formed for forcing the electrolyte solution to circulate in such a way.

An electrode plate may have a width of about 1 m (such as between 0.3 to 2 m), and it may have a height of 1 m (such as between 0.5 to 2 m).

The electrode plates may be embossed to a depth such that the length/total depth of the cassette (from the backside of the cathode to the backside of the anode) is about 4 mm (such as between 1 mm to 20 mm, or 1 mm to 10 mm)—given a plate thickness of about 0.5 mm.

Such dimensions of an electrode plate also provides that a high number of cassettes may be stacked together while applying a high voltage as possible across the stack.

Between the cassettes in the stack are membranes, i.e. in FIG. 4 is shown a membrane 82a to the left of the cassette, and a membrane 82b to the right of the cassette.

Each membrane between neighboring cassettes may be an electrical insulator for electrically insulating neighboring cassettes.

An electrolysis cell includes a cassette and a membrane.

The membrane is permeable to flow of ions such that the ions may flow through the membrane from the compartment on the first side of the membrane to the compartment on the other side of the membrane.

The membrane may be hydrophile, and it may be made of cotton, Aramid, Teflon or PES.

Figure 5:
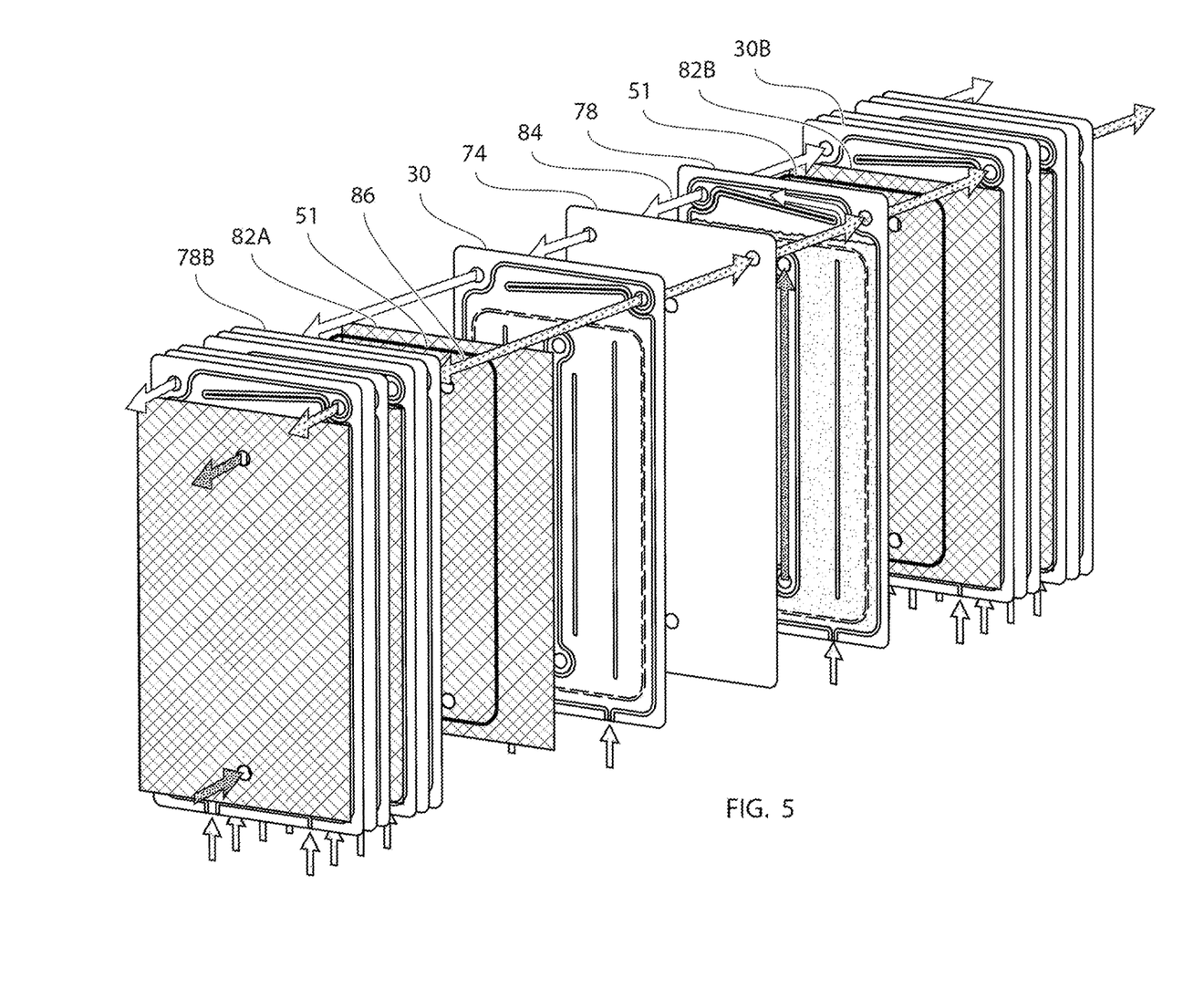
FIG. 5 shows a second exploded view of part of a stack. In total, five cassettes are illustrated in the view.

FIG. 5 shows a second exploded view of part of a stack. In total, five cassettes are illustrated in the view.

During electrolysis, ions will flow between an anode 78 compartment and a cathode 30B compartment, through membrane 82a.

Likewise, ions will flow between an anode 78 compartment, and a cathode 30B compartment, through membrane 82b.

The combined volume of anode compartment and cathode compartment constitutes a sealed volume having an electrolyte solution.

A gasket 51A on the backside of the cathode plate 30B adjacent to the membrane 82A constituting the cathode compartment may press against the electrode plate 30B constituting the anode compartment 78b for sealing the combined volume. The electrode plate 78 constituting the anode compartment may also have a gasket 51A on its backside, for example an O-ring as gasket 51A.

Arrow 84 illustrates the transport of hydrogen gas out from the cathode compartments, while arrow 86 illustrates the transport of oxygen out from the anode compartments.

The cassette 12 constituted by anode 30, bipolar plate 74, and cathode plate 78 is illustrated as being in the center of the stack. For the cassettes 12 to the left of this center cassette 12, the gas is transported to the left, and for the cassettes 12 to the right of this center cassette, the gas is transported to the left.

Figure 6:
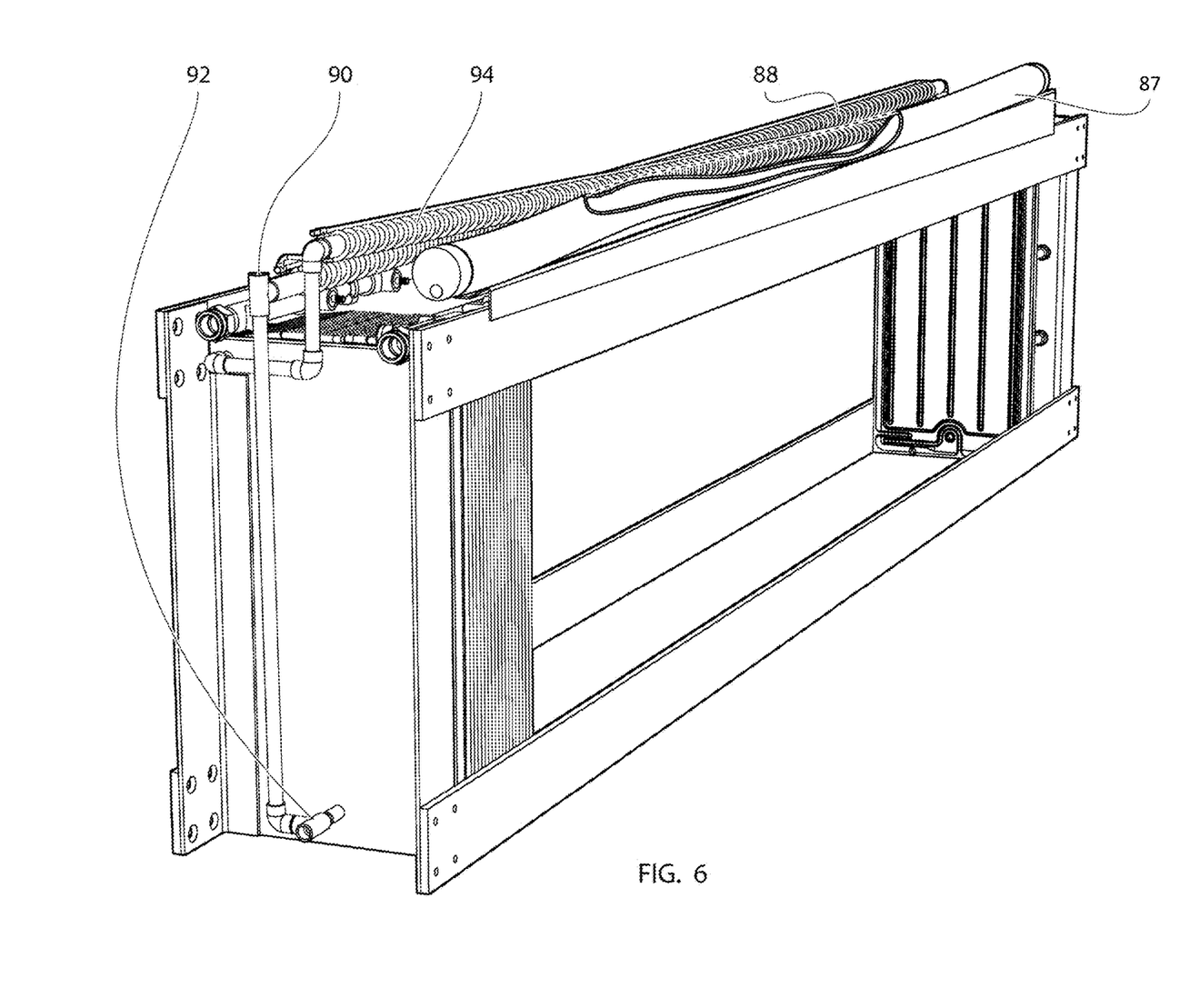
FIG. 6 shows a perspective of a stack in a frame.

FIG. 6 shows a perspective of a stack in a frame. A pressure vessel is not shown in the figure.

Each electrode plate used in the stack may correspond to the electrode plate described in connection with FIG. 3, i.e. each electrode plate has a water inlet at the bottom of the electrode plate, and a separator element for preventing electrolyte solution to flow out through the water inlet.

The outlet of oxygen from the stack is in fluid communication with a container 87 constituting an oxygen container. The oxygen container may be flexible such that it can expand and increase its volume or contract such that it can decrease its volume, i.e. act as a buffer for storing a volume of oxygen for facilitating a regulation of the pressure in the stack, because it is desirable that the hydrogen and oxygen is at substantially the same pressure.

The oxygen container may be made as a tube in an elastic material such as rubber. The oxygen container is outside the stack, but inside any pressure vessel enclosing the stack for pressurizing the stack. The oxygen container extends over the top of the stack, but may also extend or either side of the stack or below the stack.

The oxygen may be transported to an outlet in the pressure vessel for letting oxygen out of the pressure vessel, i.e. the oxygen container may be in fluid communication with the outlet. The outlet may comprise a valve.

The oxygen container may also function as a valve, i.e. if the pressure of the hydrogen inside the pressure vessel is greater than the pressure of the oxygen, the oxygen container is pressed together and the flow of oxygen through the oxygen container may be reduced—the volume of the oxygen container is reduced.

If the pressure of the hydrogen inside the pressure vessel is lower than the pressure of the oxygen, the oxygen container expands and the flow through the oxygen container is increased, and the volume of the oxygen container is increased.

There may be a second outlet of oxygen from the stack, for example at the opposite end of the stack than the first outlet described above, and the second outlet of oxygen from the stack may be in fluid communication with a second oxygen container that may correspond to the first oxygen container.

The hydrogen may exit from the stack at openings at each end of the stack. Alternatively, the hydrogen may exit from the stack at an opening at one end of the stack.

The hydrogen may exit into the pressure vessel.

During operation of the electrolysis system hydrogen will build up in the volume of the pressure vessel, when a desired pressure is reached, surplus hydrogen may be transported out of the pressure vessel via a regulator such as a valve. This may be used to regulate the pressure inside the pressure vessel, i.e. if the pressure becomes too low, the regulator can be closed for a while for increasing the pressure, or if the pressure is too high, the regulator may open and let additional hydrogen out of the pressure vessel.

An outlet for letting hydrogen out from the stack may be at one end of the stack or at both ends of the stack.

The outlet may be in fluid communication with a pipeline 88 extending inside the pressure vessel 18 (and outside the stack) for transporting electrolyte solution, that have exited as vapor together with the released gas, back into the stack.

The pipeline may extend with an inclination such that it has a fall towards the opposite end of the stack than the hydrogen outlet. At the opposite end, the pipeline may be in fluid communication with a riser pipe for leading down to the water inlet at the bottom of the stack, i.e. the electrode plates have the water inlets at the bottom.

At the top of the riser pipe may be a T-section 90 having an opening for letting out hydrogen gas while condensed electrolysis solution flows down through the riser pipe.

The opening may face upwards.

At the water inlet, there may be a T-section 92 for connection to the riser pipe and a water pipeline for supply of water.

The pipeline 88 may be cooled by means of a cooling element for condensing electrolysis vapor into liquid form. The cooling element may be copper wire wound around the pipeline.

A second outlet may be in fluid communication with a pipeline 94 for the same function as the first pipeline 88.

The pipeline 90 may extend with an inclination such that it has a fall towards the opposite end of the stack than the second hydrogen outlet. At the opposite end, the pipeline may be in fluid communication with a second riser pipe for leading down to a second water inlet at the bottom of the stack.

At the second water inlet, there may be a second T-section for connection to the second riser pipe and a second water pipeline for supply of water.

The pipeline 90 may be cooled by means of a second cooling element for condensing electrolysis vapor into liquid form. The cooling element may be copper wire wound around the pipeline.

Figure 7:
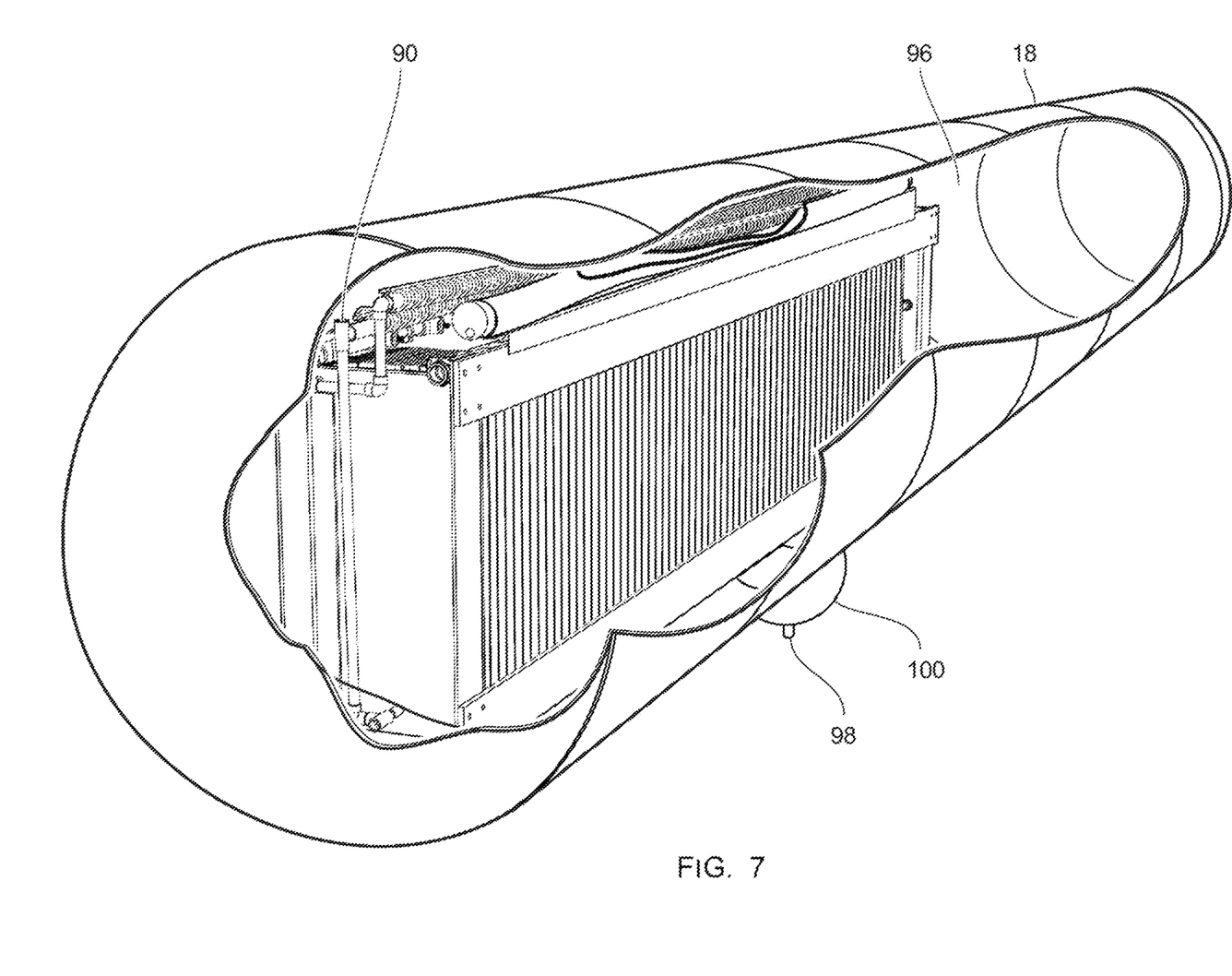
FIG. 7 shows a perspective of the stack described in connection with FIG. 6 accommodated in a container 18. Other types of stacks for production of hydrogen may be used in the container.

FIG. 7 shows a perspective of the stack described in connection with FIG. 6 accommodated in a container 18. Other types of stacks for production of hydrogen may be used in the container.

Figure 8:
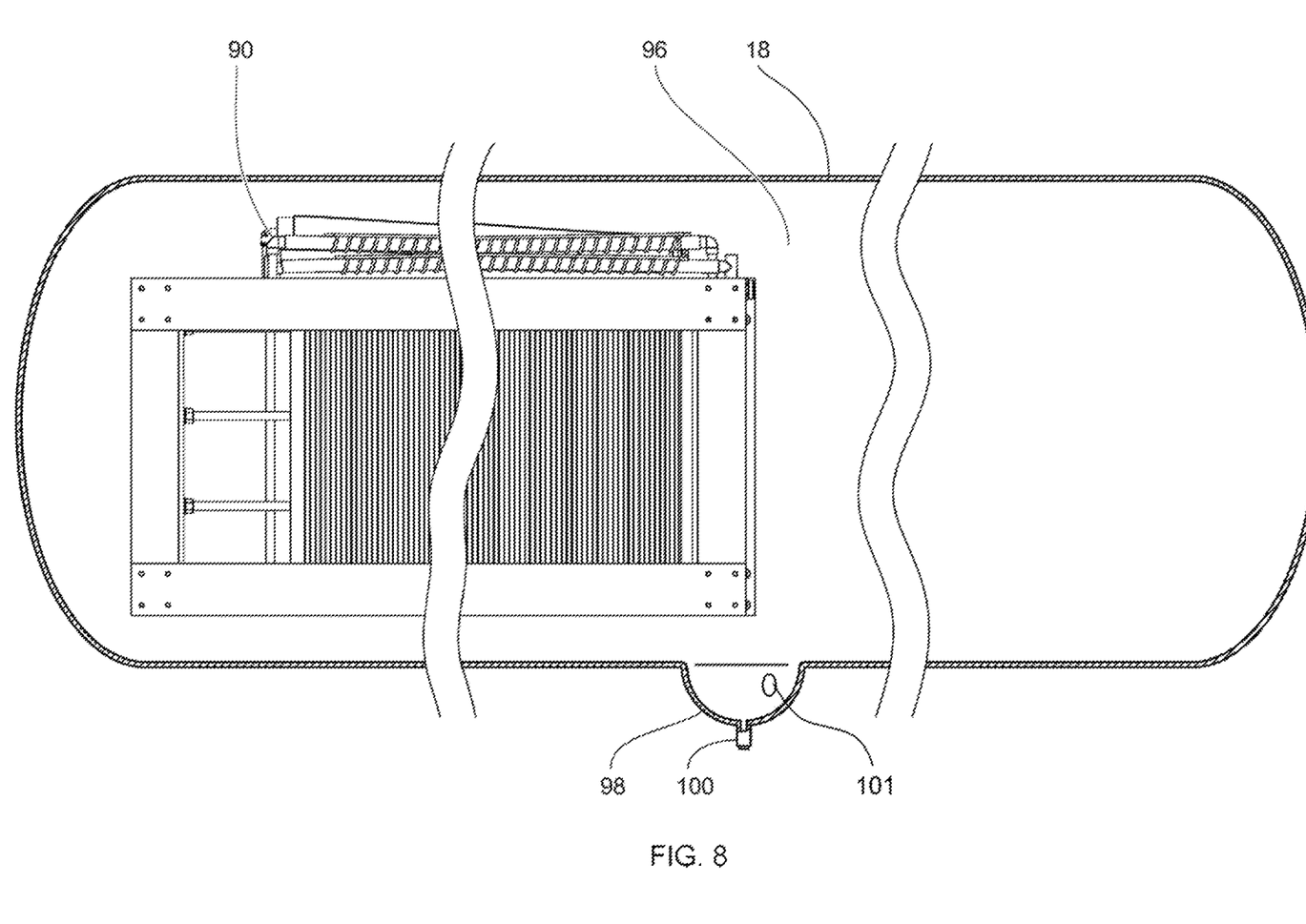
FIG. 8 is a cross section of the stack shown in perspective in FIG. 7.

FIG. 8 is a cross section of the stack shown in perspective in FIG. 7.

The stack has an outlet arranged such that hydrogen being released in the cathode compartments of the stack flows out of the outlet and into the volume defined by the container.

Specifically, in FIG. 7 it is shown that the outlet at the T-section 90 has an opening freely exposed in the volume of the container.

The container may comprise a valve or tap for tapping hydrogen stored in the container for example when the container is full. Thus, the container may function as a buffer container and it may also or as an alternative function as a pressure vessel for pressurizing the electrolyte solution in the stack as described above in connection with FIGS. 1-6. The container is arranged so that the volume 96 defined by the container is greater than the volume defined by the stack.

For example, the length of the container may be greater than the length of the stack. It is contemplated that the length of the container may be 20 foot or 40 foot.

In addition, or as an alternative, the circumference or radius of the container may be greater than the circumference or radius of the stack in order to define a volume for storing hydrogen.

For example, the stack may have a rectangular or square cross section while the container may have a substantial circular cross section. In this case the diameter of the container is greater or equal to the diagonal of the stack, and an excess volume is defined around the stack.

Oxygen may enter the container due to cross flow, and be mixed with the hydrogen in the container due to convection and that hydrogen has a high rate of diffusion so that the hydrogen and oxygen mixes relatively fast.

The container may have a sensor (hydrogen sensor) for detecting hydrogen, and the sensor may be arranged at the top of the container 18.

The container may have a sensor 101 (oxygen sensor) for detecting oxygen, and the sensor may be arranged at the bottom of the container 18.

It is contemplated that during an inactive period of the electrolysis system, the hydrogen and oxygen may be layered in that the oxygen will flow downwards, and the hydrogen will flow upwards.

Oxygen at the bottom of may be emptied via a valve 100 at the bottom of the container 18.

FIG. 7 shows that the container may bulge outwards and form an excess oxygen container 98 such as in the form of a hump.

The oxygen sensor may be placed at the excess oxygen container 98, and the valve 100 may also be placed at the excess oxygen container 98, for example inside the outwards bulging portion. If oxygen leaks into the container 18, the oxygen may accumulate at the bottom and flow into the excess oxygen container 98 and can be drained therefrom through the valve 100.

In particular, the valve 100 may be functionally connected to the oxygen sensor and automated to open for drain of oxygen as a result of the sensor measuring oxygen. By draining oxygen from the excess oxygen container 98, the amount of oxygen in the container is reduced so that risk for explosion is minimized when the container 18 contains hydrogen.

The invention claimed is:

1. An electrolysis system for production of hydrogen comprising:
a stack of electrolysis cells including a first electrolysis cell and a second electrolysis cell, said first electrolysis cell comprising a first compartment including a first electrode and an electrolyte solution for releasing hydrogen gas in said first compartment, said stack being enclosed in a chamber constituting a buffer container, said buffer container having a first end and a second end opposite said first end, said stack arranged between said first end and said second end, said stack having an outlet constituting a hydrogen outlet for flow of said hydrogen gas into said buffer container for filling said buffer container with said hydrogen gas for storing said hydrogen gas, wherein a bottom of the buffer container comprises an oxygen sensor for detecting oxygen and wherein the electrolysis system is configured for removing oxygen from the buffer container via a valve at the bottom of the buffer container, wherein the bottom of the buffer container bulges outwards, forming an excess oxygen container in the form of a hump, wherein the oxygen sensor and the valve are placed at the excess oxygen container.

2. The electrolysis system according to claim 1 wherein said hydrogen outlet is arranged above a surface of said electrolyte solution in said first compartment for separating said electrolyte solution from said hydrogen gas for containing said electrolyte solution in said first compartment and preventing said electrolyte solution from flowing through said hydrogen outlet.

3. The electrolysis system according to claim 2, wherein said buffer container contains said hydrogen gas but no liquid.

4. The electrolysis system according to claim 1, said buffer container having a hydrogen outlet valve for opening for a flow of hydrogen gas out of said buffer container, the hydrogen outlet valve being different from the valve for oxygen at the bottom of the buffer container.

5. The electrolysis system according to claim 1, said stack having a first volume and said buffer container having a second volume, said second volume being at least 50% greater than said first volume.

6. The electrolysis system according to claim 1, said stack having a first volume and said buffer container having a second volume, said second volume being at least 70% greater than said first volume.

7. The electrolysis system according to claim 1, said stack having a first volume and said buffer container having a second volume, said second volume being at least 100% greater than said first volume.

8. The electrolysis system according to claim 1, said stack having a first length, and said buffer container having a second length defined as the distance between said first end and said second end, said buffer container arranged such that said second length is at least 10% greater than said first length.

9. The electrolysis system according to claim 1, said stack having a first length, and said buffer container having a second length defined as the distance between said first end and said second end, said buffer container arranged such that said second length is at least 25% greater than said first length.

10. The electrolysis system according to claim 1, said stack having a first length, and said buffer container having a second length defined as the distance between said first end and said second end, said buffer container arranged such that said second length is at least 50% greater than said first length.

11. The electrolysis system according to claim 1, said stack having a first length, and said buffer container having a second length defined as the distance between said first end and said second end, said buffer container arranged such that said second length is at least 100% greater than said first length.

12. The electrolysis system according to claim 1, said buffer container comprising a first sensor for detecting hydrogen, said first sensor arranged above the bottom of said buffer container.

13. The electrolysis system according to claim 1, said buffer container comprising a first sensor for detecting hydrogen, said first sensor arranged at a top of said buffer container.

14. The electrolysis system according to claim 1, wherein the valve is functionally connected with the oxygen sensor and automated to open for drainage of oxygen as a result of the oxygen sensor measuring oxygen.

15. An electrolysis system for production of hydrogen comprising:
a stack of electrolysis cells including a first electrolysis cell and a second electrolysis cell, said first electrolysis cell comprising a first compartment including a first electrode and an electrolyte solution for releasing hydrogen gas in said first compartment, said stack being enclosed in a chamber constituting a buffer container, said buffer container having a first end and a second end opposite said first end, said stack arranged between said first end and said second end, said stack having an outlet constituting a hydrogen outlet for flow of said hydrogen gas into said buffer container for filling said buffer container with said hydrogen gas for storing said hydrogen gas, wherein a bottom of the buffer container comprises an oxygen sensor for detecting oxygen and wherein the electrolysis system is configured for removing oxygen from the buffer container via a valve at the bottom of the buffer container, wherein said hydrogen outlet is arranged above a surface of said electrolyte solution in said first compartment for separating said electrolyte solution from said hydrogen gas for containing said electrolyte solution in said first compartment and preventing said electrolyte solution from flowing through the hydrogen outlet.

16. An electrolysis system for production of hydrogen comprising:
a stack of electrolysis cells including a first electrolysis cell and a second electrolysis cell, said first electrolysis cell comprising a first compartment including a first electrode and an electrolyte solution for releasing hydrogen gas in said first compartment, said stack being enclosed in a chamber constituting a buffer container, said buffer container having a first end and a second end opposite said first end, said stack arranged between said first end and said second end, said stack having an outlet constituting a hydrogen outlet for flow of said hydrogen gas into said buffer container for filling said buffer container with said hydrogen gas for storing said hydrogen gas, wherein a bottom of the buffer container comprises an oxygen sensor for detecting oxygen and wherein the electrolysis system is configured for removing oxygen from the buffer container via a valve at the bottom of the buffer container, wherein the valve is functionally connected with the oxygen sensor and automated to open for drainage of oxygen as a result of the oxygen sensor measuring oxygen.

* * * * *